March 3, 1959  R. L. STREBINGER  2,875,859
BRAKE WITH SPACED LINING SEGMENTS
Filed Jan. 17, 1955  2 Sheets-Sheet 1

INVENTOR.
ROBERT L. STREBINGER
BY
John A. Young
ATTORNEY

March 3, 1959 R. L. STREBINGER 2,875,859
BRAKE WITH SPACED LINING SEGMENTS
Filed Jan. 17, 1955 2 Sheets-Sheet 2
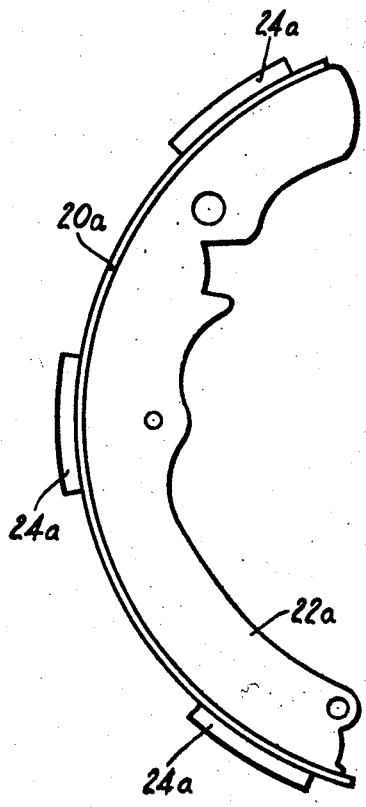
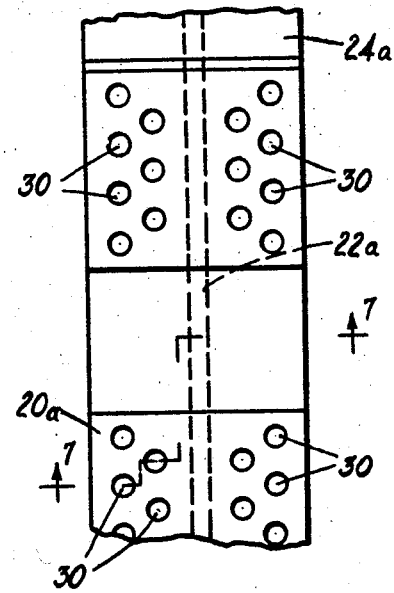
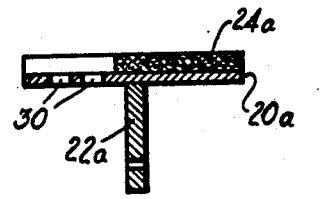
INVENTOR.
ROBERT L. STREBINGER
BY John A. Young
ATTORNEY United States Patent Office 2,875,859
Patented Mar. 3, 1959

2,875,859

BRAKE WITH SPACED LINING SEGMENTS

Robert L. Strebinger, South Bend, Ind., assignor to Bendix Aviation Corporation, South Bend, Ind., a corporation of Delaware Application January 17, 1955, Serial No. 482,195

6 Claims. (Cl. 188—78)

This invention relates generally to brake shoes and specifically to constructions thereof including various arrangements of friction material lining on said brake shoes.

The braking art is confronted with the problem of efficiently dispersing heat which develops from kinetic energy absorption by the brake. The problem has become particularly acute since kinetic energies have greatly increased because of higher vehicle speeds. The trend in vehicle performance indicates that the kinetic energy absorption requirements for brakes will become successively greater.

The heat which is developed during a braking stop produces many undesirable characteristics, (1) the rate of lining wear increases; (2) pedal travel increases because of drum expansion; (3) the coefficient of friction between the lining and drum diminishes so that the brake loses effectiveness and (4) hydraulic fluid is heated to such a degree that boiling and vaporization of the fluid is not uncommon.

The present invention is designed to alleviate these conditions by obtaining a cooler running brake.

The invention has for its objects, among others:

(a) Decreasing the period of time during which any section of a rotatable drum is engageable with a friction-producing surface.

(b) Improving heat dissipation by exposing the surface of the rotatable member for longer periods of time, to thereby enable convection currents and radiation to reduce operating temperatures.

Other objects and improvements of the invention will become evident from a consideration of the following description, in which a plurality of example embodiments are considered in connection with the following drawings, wherein:

Figure 5 is an elevation view of a second brake shoe constituting another embodiment of the invention; and Figure 6 is a side view of Figure 5 looking from the left hand side thereof; and Figure 7 is a section view taken on line 7—7 of Figure 6.

Figure 1:
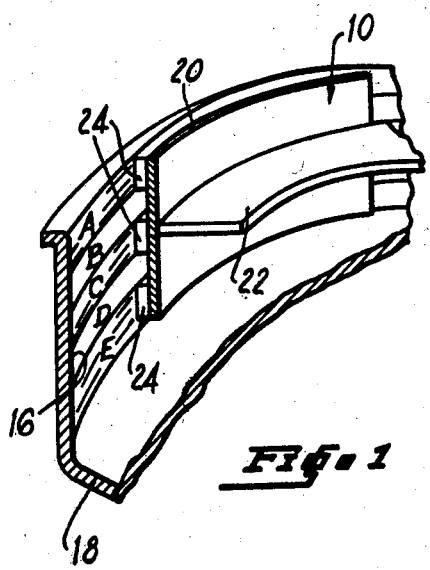
Figure 1 is a fragmentary isometric view of one of the brake shoes and brake drum.
Figure 2:
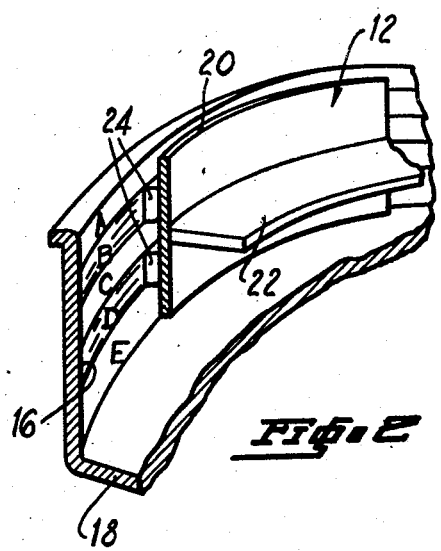
Figure 2 is a fragmentary isometric view of a second brake shoe and brake drum.
Figure 4:
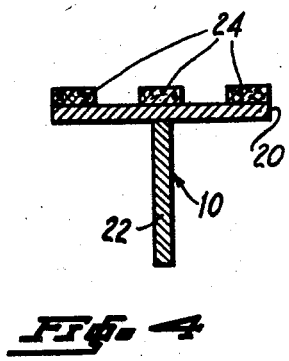
Figure 4 is a section view taken on line 4—4 of Figure 3.
Figure 3:
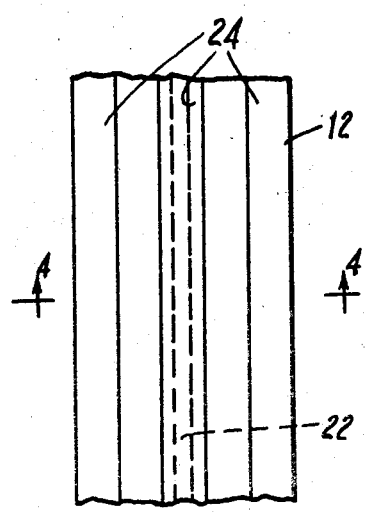
Figure 3 is a top view of the brake shoe shown in Figure 1.

Referring to the drawings, and specifically the embodiment shown in Figures 1 to 4, brake shoes 10 and 12 are engageable with cyclindrical surface 16 of drum 18. Ordinarily, the brake shoes are a stationary part of the brake, and engage an anchor in the usual manner to impede rotation of the drum. The drum 18 is secured to a rotatable part of the vehicle as for example, a hub (not shown).

There is provided the usual pair of brake shoes forming a "shoe ring." Each of the brake shoes is inclusive of a rim 20 and transverse strengthening web 22. A plurality of arcuate lining strips 24 are secured to the outer surface of the rim 20 in some preferred manner e. g. bonding, riveting, etc.

The surfaces of the lining segments on the brake shoe trace separate zones on the drum surface 16 which are labelled A through E in Figure 1. It will be noted that zones A, C and E which are engageable with the lining segments on the secondary shoe 10, are spaced apart on the surface of the drum. The zones B and D are also spaced apart, these zones are traced by the lining segments on the primary shoe 12. The zones A through E, blend to cover the entire cylindrical surface 16 of the drum 18.

As a result of dividing the engaging surface 16 of the drum into zones, it is possible to reduce the period of time during which any portion of the drum surface is engaged. The net result is that the surface of the drum is exposed for a greater duration or period during each revolution of the drum. This exposure of the drum surface for greater periods of time results in more efficient heat dispersion through convection and radiation.

It might be thought that reducing the engageable surface of the lining on each brake shoe would result in reduced wear life of the lining on the shoe. This has not proved to be the case. Rate of lining wear depends in part on braking temperature. Because the operating temperatures have been reduced, it is possible to divide the lining into segments and reduce the lining area without appreciable increase in rate of wear of the lining on the brake shoes.

It will be noted that the lining segments on the secondary brake shoe 10 form a larger engageable area than on the primary shoe 12, the reason being that the secondary shoe 10 absorbs more of the kinetic energy of a stop during braking with forward vehicle movement. The greater area of lining on the secondary shoe makes it possible to construct the shoe ring so that both the primary and secondary shoes have a substantially equal wear life.

Another shoe construction which I have found reduces brake temperatures is shown in Figures 5 to 7. The lining strips or segments 24a are arranged transversely on rim 20a. These segments are spaced apart to provide intervals during which the engageable surface of the drum is exposed. The time during which any portion of the drum surface 24a is engaged, has been very greatly reduced because of the spacing of the lining segments. During the time intervals in which the drum surface is exposed, there is improved heat dispersion through convection currents and radiation. A plurality of openings 30 may be provided in the rim 20a to promote circulation of air through the brake and across the drum surface, to promote cooling of the brake.

Various lining segment spacings may be resorted to in accomplishing the objects of the invention. All of these spacings are aimed toward decreasing the time during which the drum is engaged; or conversely, increasing the period of exposure of the drum surface. Various additional spacings of lining segments will occur to those skilled in the art, and such revisions of the embodiments shown here may be made without departing from the underlying principles of the invention.

I claim:

1. An articulated pair of brake shoes, each comprising an arcuate rim, a transverse strengthening web, and a plurality of friction material lining segments secured to the rims of said shoes, said segments being secured along the edges and mid-portion of the secondary shoe, said segments secured to the primary shoe being arranged to present friction surfaces alternating with the friction surfaces of the segments on said secondary shoe, said segments being thereby positioned to trace substantially distinct paths on a rotating member which are cumulative in width to the width of the rims of said primary and secondary brake shoes.

2. A brake comprising a brake drum having a cylindrical friction-element-engaging surface, a pair of brake shoes each inclusive of a rim and transverse strengthening web, and a plurality of friction lining segments secured to the rims of said shoes, one of said shoes having the segments thereon arranged to present axially separated friction producing surfaces, the other of said shoes having the segments thereon arranged to present axially separated friction producing surfaces, the surfaces of said lining segments being so located to trace alternating paths on the cylindrical surface of said drum so that sections of the cylindrical surface of said drum are engageable with the friction producing surfaces of lining segments on only one of said shoes.

3. In a brake, a brake drum having a cylindrical friction-element-engaging surface, a plurality of axially aligned interconnected brake shoes, each having a plurality of axially spaced-apart arcuate lining segments secured thereto, and a plurality of zones on the cylindrical friction-element-engaging surface of said drum, each of said zones being engageable with a lining segment on only one of said shoes so that alternating zones on the cylindrical surface of said drum are contacted by alternating lining segments on a respective shoe.

4. In a brake, a plurality of end-to-end friction-producing elements arranged in substantially coplanar relation, and a rotatable drum having a cylindrical surface engageable with said elements, said elements being arranged to trace distinctive zones on the surface of said rotatable drum so that portions of said rotatable drum are engageable with only one of the plurality of friction-producing elements, said rotatable drum surface being substantially equal in width to the width of the elements taken separately.

5. In a brake, a pair of brake shoes arranged in end-to-end relation and in substantially coplanar positions, a plurality of lining segments having distinct friction surfaces, said brake shoes having said segments secured thereto, a rotatable member having a cylindrical surface of approximately the width of one of said shoes, said cylindrical surface being engageable with the friction surfaces of said segments, and a plurality of zones of the cylindrical surface of said rotatable member which are engageable with the friction surfaces associated with only one of said brake shoes.

6. In a brake, a pair of brake shoes arranged in end-to-end relation, each of said shoes having segments of friction lining constructed in arcuate strips which extend along the length of the brake shoe and are laterally spaced-apart, the lining segments on said respective shoes being relatively spaced with respect to each other to form a staggered pattern of friction lining surfaces which are distinct with respect to each shoe and form a continuous friction surface which is of no greater width than the shoes taken separately.

References Cited in the file of this patent

UNITED STATES PATENTS

| | | |
|---|---|---|
| 774,448 | Norris | Nov. 8, 1904 |
| 1,877,430 | Skopik | Sept. 13, 1932 |
| 2,384,614 | Forbes | Sept. 11, 1945 |
| 2,661,819 | Strohm | Dec. 8, 1953 |

FOREIGN PATENTS

| | | |
|---|---|---|
| 74,405 | Switzerland | Feb. 16, 1917 |